United States Patent
Lan et al.

(10) Patent No.: US 9,535,576 B2
(45) Date of Patent: Jan. 3, 2017

(54) TOUCHSCREEN APPARATUS USER INTERFACE PROCESSING METHOD AND TOUCHSCREEN APPARATUS

(71) Applicant: Huawei Device Co., LTD, Shenzhen (CN)

(72) Inventors: Fang Lan, Shenzhen (CN); Gang Wu, Shanghai (CN); Jie Xu, Shanghai (CN)

(73) Assignee: Huawei Device Co. Ltd., Shenzhen (CN)

( * ) Notice: Subject to any disclaimer, the term of this patent is extended or adjusted under 35 U.S.C. 154(b) by 501 days.

(21) Appl. No.: 13/900,280

(22) Filed: May 22, 2013

(65) Prior Publication Data

US 2014/0101581 A1    Apr. 10, 2014

Related U.S. Application Data

(63) Continuation of application No. PCT/CN2012/082535, filed on Oct. 8, 2012.

(51) Int. Cl.
*G06F 3/048* (2013.01)
*G06F 3/0484* (2013.01)
*G06F 3/0488* (2013.01)

(52) U.S. Cl.
CPC ........... *G06F 3/0484* (2013.01); *G06F 3/0488* (2013.01); *G06F 3/04883* (2013.01)

(58) Field of Classification Search
CPC ...... G06F 3/0481; G06F 3/016; G06F 3/0482; G06F 3/04817
See application file for complete search history.

(56) References Cited

U.S. PATENT DOCUMENTS

| | | | |
|---|---|---|---|
| 2005/0007372 A1* | 1/2005 | Ecob et al. | 345/473 |
| 2008/0303799 A1 | 12/2008 | Schwesig et al. | |
| 2009/0109187 A1 | 4/2009 | Noma | |
| 2009/0265628 A1* | 10/2009 | Bamford et al. | 715/702 |
| 2010/0100849 A1* | 4/2010 | Fram | 715/835 |
| 2010/0283744 A1 | 11/2010 | Nordenhake et al. | |
| 2010/0306650 A1* | 12/2010 | Oh et al. | 715/702 |
| 2011/0299737 A1 | 12/2011 | Wang et al. | |
| 2012/0005578 A1* | 1/2012 | Hawkins | 715/702 |
| 2012/0032979 A1* | 2/2012 | Blow et al. | 345/647 |

FOREIGN PATENT DOCUMENTS

CN    101320303 A    12/2008
CN    101339489 A    1/2009
(Continued)

OTHER PUBLICATIONS

International Search Report received in Application No. PCT/CN2012/082535, mailed Jul. 18, 2013, 11 pages.

*Primary Examiner* — Anil N Kumar
(74) *Attorney, Agent, or Firm* — Slater Matsil, LLP

(57) ABSTRACT

Embodiments of the present invention provide a touchscreen apparatus user interface processing method. The method includes obtaining touch information; arranging a first user interface of an application program according to the touch information, where the arrangement is adjusting an element position of the user interface; and presenting a second user interface that is of the application program and is obtained after the arrangement. A touchscreen apparatus and a graphical user interface are also provided.

13 Claims, 11 Drawing Sheets

(56) References Cited

FOREIGN PATENT DOCUMENTS

| | | |
|---|---|---|
| CN | 101424990 A | 5/2009 |
| CN | 102270036 A | 12/2011 |
| CN | 102299986 A | 12/2011 |
| CN | 102299996 A | 12/2011 |
| CN | 102422252 A | 4/2012 |
| CN | 102460353 A | 5/2012 |
| JP | 2008305174 A | 12/2008 |
| JP | 2009110286 A | 5/2009 |
| JP | 2010020601 A | 1/2010 |
| JP | 2012191445 A | 10/2012 |
| WO | WO 2013/026377 A1 | 2/2013 |

* cited by examiner

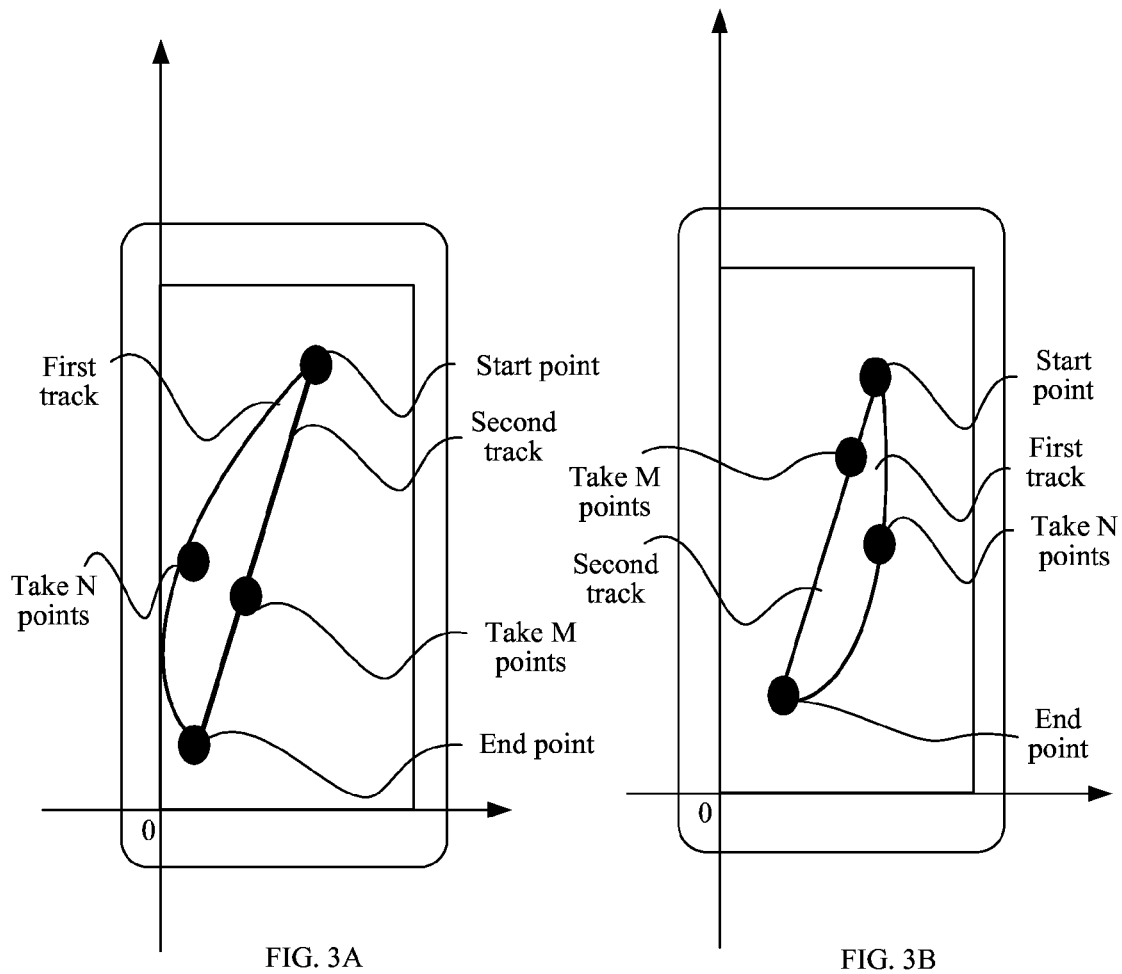

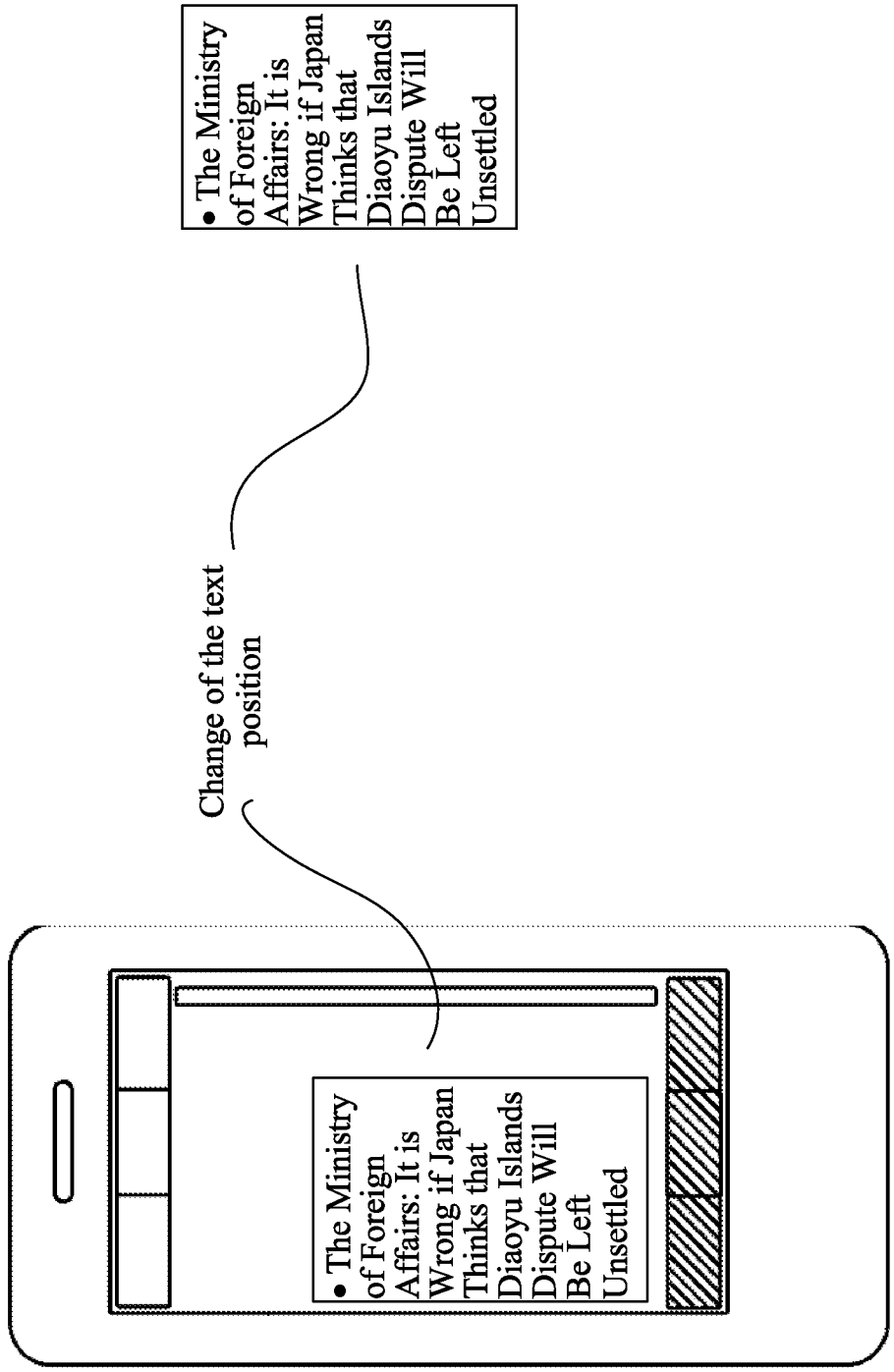

TOUCHSCREEN APPARATUS USER INTERFACE PROCESSING METHOD AND TOUCHSCREEN APPARATUS

CROSS-REFERENCE TO RELATED APPLICATIONS

This application is a continuation of International Application No. PCT/CN2012/082535, filed on Oct. 8, 2012, which is hereby incorporated by reference in their entireties.

TECHNICAL FIELD

The present invention relates to the field of touchscreen apparatuses, and in particular embodiments, to a touchscreen apparatus user interface processing method and a touchscreen apparatus.

BACKGROUND

A touchscreen apparatus (such as a mobile phone, a tablet computer, and an automatic teller machine that have a touchscreen) works by using a voltage on an X-Y electrode grid that covers the touchscreen apparatus. When a finger approaches an electrode, capacitance changes and is measurable. By comparing measured values of all electrodes, a position of the finger may be precisely located, that is, position information and pressure information of a touch point are determined.

With the development of science and technology, a screen of a touchscreen apparatus is becoming larger, which causes operational inconvenience while bringing visual enjoyment to a user. An existing touchscreen apparatus is only used to determine position information and pressure information of an operation performed by a user on content of a user interface. When the user uses a touchscreen apparatus with a large screen, because it is inconvenient to operate the large screen, interactivity between the touchscreen apparatus and the user becomes poor and an intelligent level is low.

SUMMARY OF THE INVENTION

The technical solutions provide a touchscreen apparatus user interface processing method and a touchscreen apparatus, so as to improve an intelligent level of a touch operation on a touchscreen apparatus and interactivity with a user.

In a first aspect, a touchscreen apparatus user interface processing method is provided. The method includes: obtaining touch information; arranging a first user interface of an application program according to the touch information, where the arrangement is adjusting an element position of the user interface; and presenting a second user interface that is of the application program and is obtained after the arrangement.

In a first possible implementation manner of the first aspect, the touch information includes touch track information, and the arranging the first user interface of the application program according to the touch information specifically includes: obtaining connection line position information between position information of a touch start point and position information of a touch end point according to the touch track information; determining a relative position between the touch track information and the connection line position information, where the relative position includes that: the touch track information is located at the right side or the left side of the connection line position information; and arranging the first user interface of the application program according to the relative position.

With reference to the first possible implementation manner of the first aspect, in a second possible implementation manner of the first aspect, the determining the relative position between the connection line position information and the touch track information specifically includes: taking N points in the touch track information; taking M points in the connection line position information correspondingly; if a predetermined number of points among the N points are located at the left side of the M points, determining that the touch track information is located at the left side of the connection line position information; and if a predetermined number of points among the N points are located at the right side of the M points, determining that the touch track information is located at the right side of the connection line position information, where M is equal to N, and N and M are natural numbers that are greater than 1.

In a third possible implementation manner of the first aspect, the touch information includes touch track information, and the arranging the first user interface of the application program according to the touch information specifically includes: determining a relative position between the touch track information and a touchscreen according to the touch track information; and arranging the first user interface of the application program according to the determined relative position.

With reference to the third possible implementation manner of the first aspect, in a fourth possible implementation manner of the first aspect, the method for determining, according to the touch track information, the relative position between a track formed by the touch position information and the touchscreen includes: dividing the touchscreen into four quadrants; and determining, according to a quadrant where the track formed by the touch position information is located, the relative position between the track formed by the touch position information and the touchscreen.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner of the first aspect, the arranging the first user interface of the application program according to the touch information specifically includes: obtaining an arrangement instruction according to the touch information; within predetermined time, determining the arrangement instruction that is obtained for the greatest number of times; and arranging the first user interface of the application program according to the arrangement instruction that is obtained for the greatest number of times.

With reference to the fifth possible implementation manner of the first aspect, in a sixth possible implementation manner, the obtaining the arrangement instruction that is obtained for the greatest number of times specifically includes: within the predetermined time, if the number of times is greater than a predetermined value of the number of times, obtaining the arrangement instruction that is obtained for the greatest number of times.

In a seventh possible implementation manner of the first aspect, the touch information includes touch pressure information and touch position information, and the method for arranging the first user interface of the application program according to the touch information specifically includes: if the touch pressure information is greater than a predetermined pressure value, arranging the first user interface of the application program according to the touch position information.

In an eighth possible implementation manner of the first aspect, the touch information includes touch position information, and the arranging the first user interface of the application program according to the touch information specifically includes: if the touchscreen apparatus obtains the same touch position information for more than predetermined time or for more than a predetermined number of times, arranging the first user interface of the application program according to the touch position information.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, in a ninth possible implementation manner, after the presenting the second user interface of the application program, the method further includes: obtaining a canceling instruction, and canceling presentation of the second user interface according to the canceling instruction.

In a second aspect, the technical solution relates to a touchscreen apparatus, which includes: an obtaining unit, configured to obtain touch information; a processing unit, configured to receive the touch information from the obtaining unit, and arrange a first user interface of an application program according to the touch information, where the arrangement is adjusting an element position of the user interface; and a presenting unit, configured to receive information of the processing unit, and present a second user interface that is of the application program and is obtained after the arrangement.

In a first possible implementation manner of the second aspect, the unit is specifically configured to receive the touch information from the obtaining unit, where the touch information includes touch track information; obtain connection line position information between position information of a touch start point and position information of a touch end point according to the touch track information; determine a relative position between the touch track information and the connection line position information, where the relative position includes that: the touch track information is located at the right side or the left side of the connection line position information; and arrange the first user interface of the application program according to the relative position.

In a second possible implementation manner of the second aspect, the processing unit is specifically configured to receive the touch information from the obtaining unit, where the touch information includes touch track information; determine a relative position between the touch track information and a touchscreen according to the touch track information; and arrange the first user interface of the application program according to the relative position.

In a third possible implementation manner of the second aspect, the processing unit is specifically configured to receive touch pressure information and touch position information from the obtaining unit; and if the touch pressure information is greater than a predetermined pressure value, arrange the first user interface of the application program according to the touch position information.

In a fourth possible implementation manner of the second aspect, the processing unit is specifically configured to receive the touch information from the obtaining unit, where the touch information comprises touch position information; if the touchscreen apparatus obtains the same touch position information for more than predetermined time or for more than a predetermined number of times, arrange the first user interface of the application program according to the touch position information.

With reference to the second aspect, or the first possible implementation manner of the second aspect, or the second possible implementation manner of the second aspect, or the third possible implementation manner of the second aspect, or the fourth possible implementation manner of the second aspect, in a fifth possible implementation manner, the obtaining unit is further configured to obtain a canceling instruction; and the processing unit is further configured to receive the canceling instruction of the obtaining unit, and cancel presentation of the second user interface according to the canceling instruction.

In a third aspect, a user interface processing touchscreen apparatus includes: a touchscreen, a memory, a CPU, a power management chip, an RF circuit, a peripheral interface, an audio circuit, a loudspeaker, and an I/O subsystem. The touchscreen is configured to obtain touch information; the CPU is configured to receive the touch information of the touchscreen, and arrange a first user interface of an application program according to the touch information, where the arrangement is adjusting an element position of the user interface; and the touchscreen is further configured to receive an arrangement processing result of the CPU, and present a second user interface that is of the application program and is obtained after the arrangement.

In a first possible implementation manner of the third aspect, the CPU is specifically configured to receive the touch information of the touchscreen, where the touch information includes touch track information; obtain connection line position information between position information of a touch start point and position information of a touch end point according to the touch track information; determine a relative position between the touch track information and the connection line position information, where the relative position includes that: the touch track information is located at the right side or the left side of the connection line position information; and arrange the first user interface of the application program according to the relative position.

In a fourth aspect, a graphical user interface that is set on the touchscreen apparatus in the second aspect is provided, where the graphical user interface includes: displaying a first user interface of an application program; and displaying a second user interface of the application program, where the second user interface is a graphical user interface after the first user interface of the application program is arranged according to the touch information, and the arrangement is adjusting an element position of the user interface.

A first possible implementation manner of the fourth aspect, after the displaying the second user interface of the application program, further includes displaying a third user interface of the application program, where the third user interface is a graphical user interface that is displayed after presentation of the second user interface is canceled according to a canceling instruction.

In the embodiments of the present invention, by using the touchscreen apparatus user interface processing method, intelligent levels of arrangement of a touchscreen apparatus user interface and interactivity with a user are improved. The touchscreen apparatus user interface is adaptive to an operation habit of the user, which enhances convenience for the user to use a touchscreen apparatus with a large screen.

BRIEF DESCRIPTION OF THE DRAWINGS

To describe the technical solutions in the embodiments of the present invention more clearly, the accompanying drawings required for describing the embodiments are briefly introduced in the following. Apparently, the accompanying drawings in the following description show some embodiments of the present invention, and persons of ordinary skill in the art may still derive other drawings from these accompanying drawings without creative efforts.

FIG. 2, which includes

FIG. 3, which includes FIG. 3A-3B, is a schematic diagram of a possible implementation manner for determining a relative position between touch track information and the connection line position information according to Embodiment 1 of the present invention;

FIG. 10, which includes

FIG. 11, which includes

FIG. 12, which includes

FIG. 13, which includes

FIG. 14, which includes FIG. 15, which includes FIG. 15A-15B, is a schematic diagram of presentation of another possible implementation manner for arranging a user interface in Embodiment 1 and Embodiment 5 of the present invention.

DETAILED DESCRIPTION OF ILLUSTRATIVE EMBODIMENTS

To make the objectives, technical solutions, and advantages of the embodiments of the present invention more comprehensible, the technical solutions in the embodiments of the present invention are described clearly and in the following with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. Singular forms, such as "a", "the", and "this", used in the embodiments and the appended claims of the present invention are also intended to include plural forms, unless otherwise specified in the context clearly. It should also be understood that, the term "and/or" used in this specification indicates and includes any or all possible combinations of one or more associated listed items. It should further be understood that, the term "include" used in this specification specifies the existence of the feature, entity, step, operation, element and/or component, and does not exclude the existence or addition of one or more other features, entities, operations, members, components and/or a combination thereof.

In the embodiments of the present invention, a touchscreen apparatus includes but is not limited to mobile communication devices such as a mobile phone, a personal digital assistant (Personal Digital Assistant, PDA), a tablet computer, and a portable device (such as a portable computer), and also includes devices that have touchscreens, such as an automatic teller machine (Automatic Teller Machine, ATM), which is not limited in the embodiments of the present invention.

Figure 1:
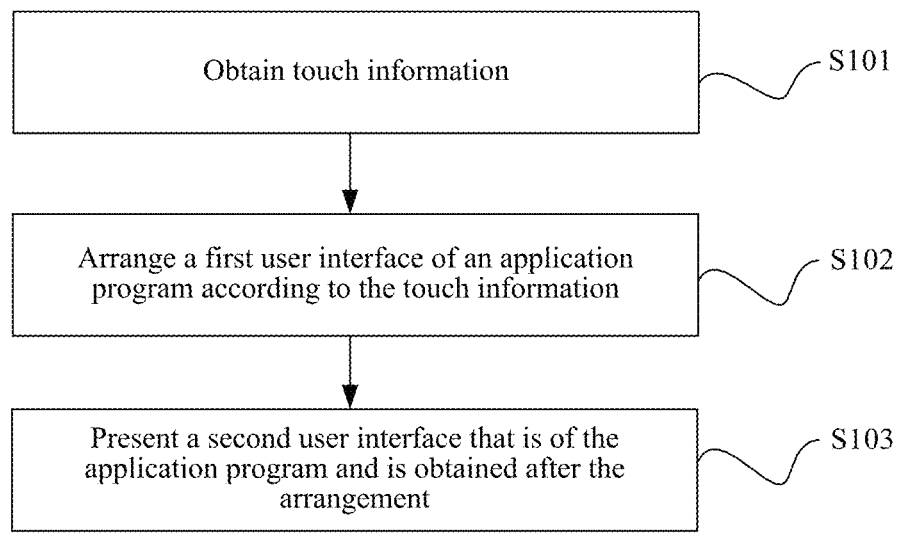
FIG. 1 is a flow chart of a touchscreen apparatus user interface processing method according to Embodiment 1 of the present invention.
Figure 2A:
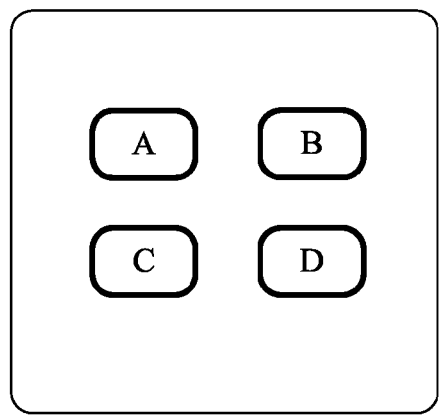
FIG. 2A-2E, is a schematic diagram of arrangement of a user interface in Embodiment 1 and Embodiment 5 of the present invention.
Figure 2B:
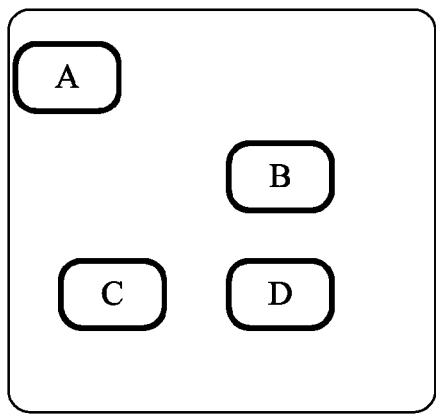
Figure 2C:
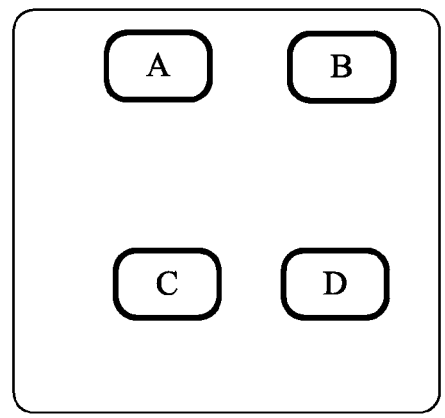
Figure 2D:
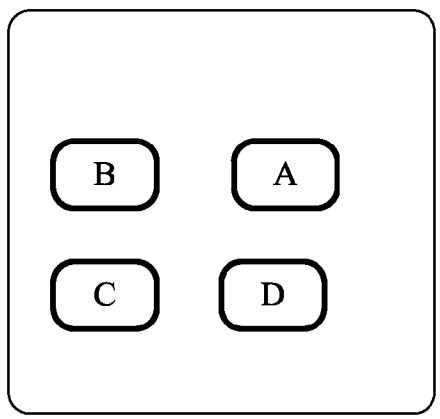
Figure 2E:
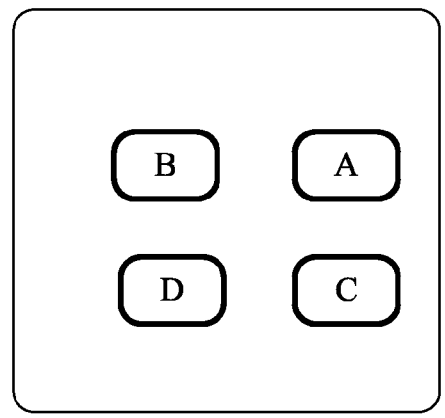

FIG. 1 is a flow chart of a touchscreen apparatus user interface processing method according to a first embodiment (Embodiment 1) of the present invention.

As shown in FIG. 1, the touchscreen apparatus user interface processing method may include the following steps.

S101: Obtain touch information.

A touchscreen apparatus obtains the touch information through a touchscreen. The touch information may include: information such as touch position information, touch area information, touch pressure information, and touch time information, and may also include other information, which is not limited in the embodiment of the present invention. Persons of ordinary skill in the art may obtain the touch information by using a touchscreen sensing technology in the prior art.

The touch information may include touch information that is generated when a user touches a touchscreen apparatus, and may also include touch information that is generated when a user performs a floating touch on a touch apparatus, and may further include touch information that is generated by a gesture of a user. A generation manner of the touch information is not limited in the embodiment of the present invention.

S102: Arrange a first user interface of an application program according to the touch information, where the arrangement is adjusting an element position of the user interface.

Figure 7:
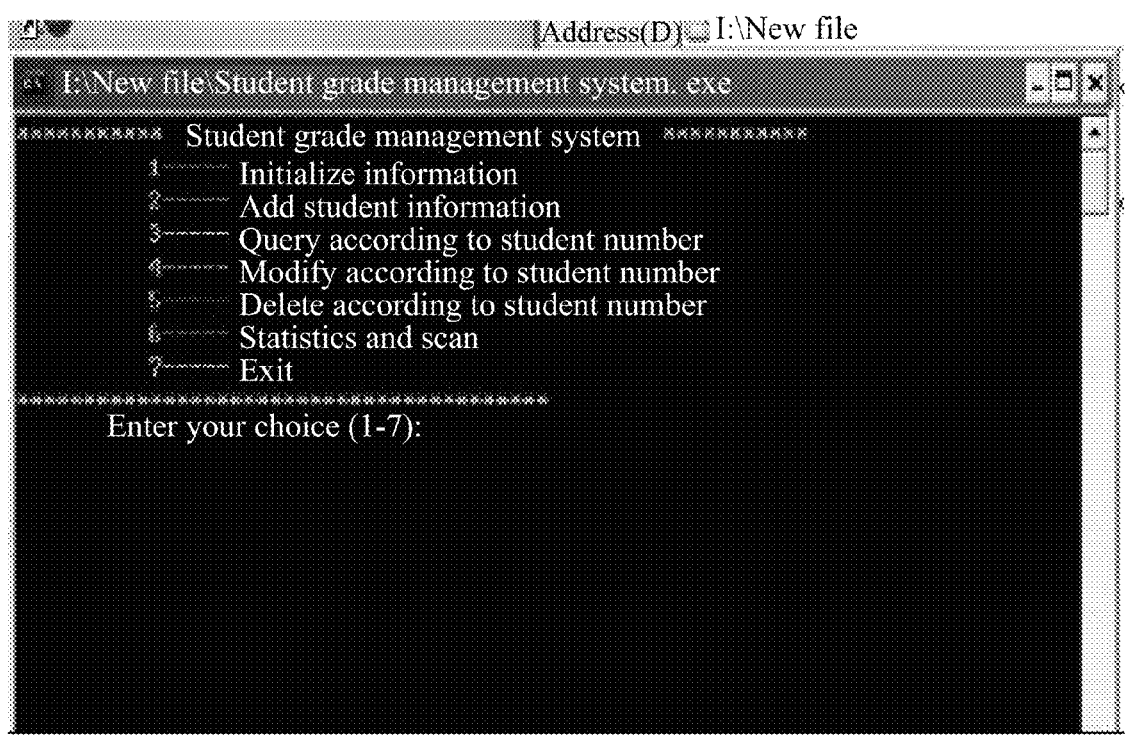
FIG. 7 is a schematic diagram of display of a character user interface.
Figure 8:
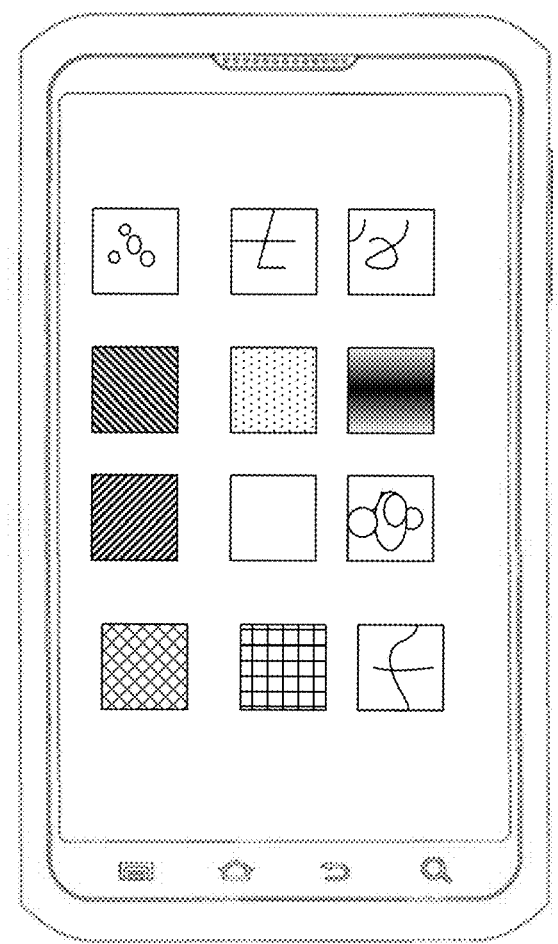
FIG. 8 is a schematic diagram of display of a graphical user interface.
Figure 9:
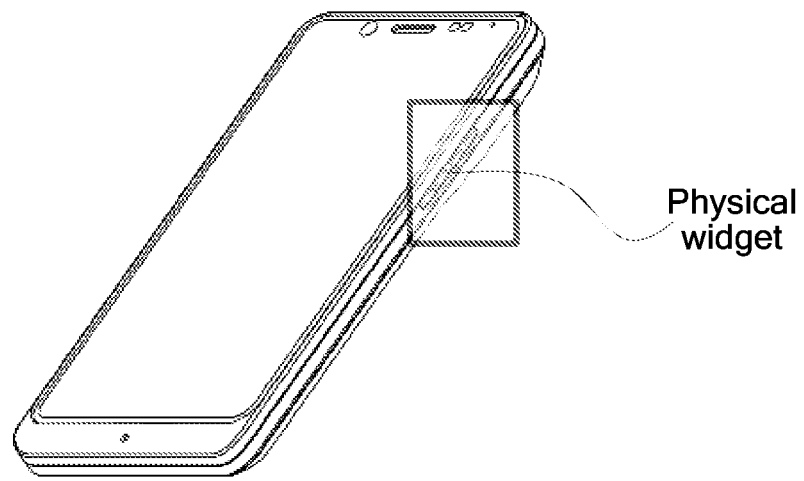
FIG. 9 is a schematic diagram of display of a physical widget user interface.

Persons of ordinary skill in the art may know that, a user interface is also called user interface, and is a medium for interaction and information exchange between a system and a user, and implements conversion of information between an internal format and a format that is acceptable to human beings. A purpose of the user interface is to enable a user to operate hardware conveniently and efficiently, so as to realize bidirectional interaction and complete work that is expected to be completed through the hardware. The user interface has a wide definition, and includes man-machine interaction and a graphical user interface. User interfaces are involved in all fields related to information communication between human beings and machines. User interfaces may specifically include a character user interface such as a user interface that has a character and is obtained through computer language programming (as shown in FIG. 7); a graphical user interface, namely, graphic user interface (Graphic User Interface, GUI), which is a most common user interface in the world currently, for example, an interface that is displayed on a mobile phone in a charging state is a graphical user interface (as shown in FIG. 8), and a user interacts with device hardware through a displayed graph (icon); and a physical character interface, namely, physical widget (as shown in FIG. 9), which is one of means for interaction and information exchange between a system and a user. Universal physical controls at present mainly include a volume key, a camera key, a power key, an unlock key on a device, and so on. Information in the interaction and information exchange between a system and a user may include information that can be sensed by a user, such as auditory information, visual information, tactile information, action information, odor information. Presenting the first user interface of the application program may specifically be: displaying a graphical user interface of the application program, prompting a physical character interface of the application program, and prompting a user interface of the application program through vibration.

It should be understood that, the first user interface is a user interface that is presented to a user when the application program has already been started, during a starting process of the application program, and during a closing process of the application program.

It should be understood that, although terms such as "first", "second", and "third" may be used to describe various kinds of user interfaces in the embodiment of the present invention, these user interfaces are not limited to these terms. These terms are merely used for distinguishing the user interfaces from each other. For example, without departing from the scope of the embodiment of the present invention, a first user interface may also be referred to as a second user interface, and similarly, a second user interface may also be referred to as a first user interface.

The arrangement is adjusting an element position of the user interface. An element of the user interface refers to design content of the user interface, which includes but is not limited to a widget, an icon, and a character, and also includes an element that is presented by the application program through another interface, for example, an interface design element of a function for associating a physical widget (as shown in FIG. 9) with ringtone and vibration. The adjusting the element position is to make adaptive adjustment on design content of a user interface of a touchscreen apparatus, especially a touchscreen apparatus with a large screen, according to the touch information. For example, if the obtained touch information is centralized at a lower left portion of the touchscreen, it is considered that a user gets used to performing an operation at the lower left portion of the touchscreen. In order to facilitate use of the user, the user interface is arranged, and the arrangement may be that elements such as a scroll bar, a letter navigation bar, and a short message sending widget is arranged at the lower left portion of the touchscreen, so as to facilitate use of the user. For example, it may also be that if the obtained touch information is centralized at a lower left portion of the touchscreen, it is considered that a user gets used to performing an operation at the lower left portion of the touchscreen. In order to facilitate use of the user, the user interface is arranged, and the arrangement may be that content to be read by the user, such as text and pictures, is moved to an upper right side of the screen, so as to prevent that some text or pictures are shielded due to an operation of the user and it is inconvenient for the user to read, thereby improving overall user experience.

S103: Present a second user interface of the application program.

It should be understood that, the second user interface is a graphical user interface that is presented to the user when the application program has already been started, during a starting process of the application program, and during a closing process of the application program.

The second user interface of the application program is presented, where the second user interface is a user interface after the first user interface of the application program is arranged according to the touch information, and the arrangement is adjusting an element position of the user interface.

Exemplarily, FIG. 2 is a schematic diagram of arrangement of a user interface. As shown in FIG. 2*a*, there are elements A, B, C, and D on a user interface. The arrangement may be arranging a position of one element A on the user interface, as shown in FIG. 2*b*; may also be arranging positions of two elements, namely elements A and B on the user interface, as shown in FIG. 2*c* or FIG. 2*d*; and may also be arranging positions of all elements, namely, elements A, B, C, and D on the user interface, as shown in FIG. 2*e*.

Figures 10A, 10B:
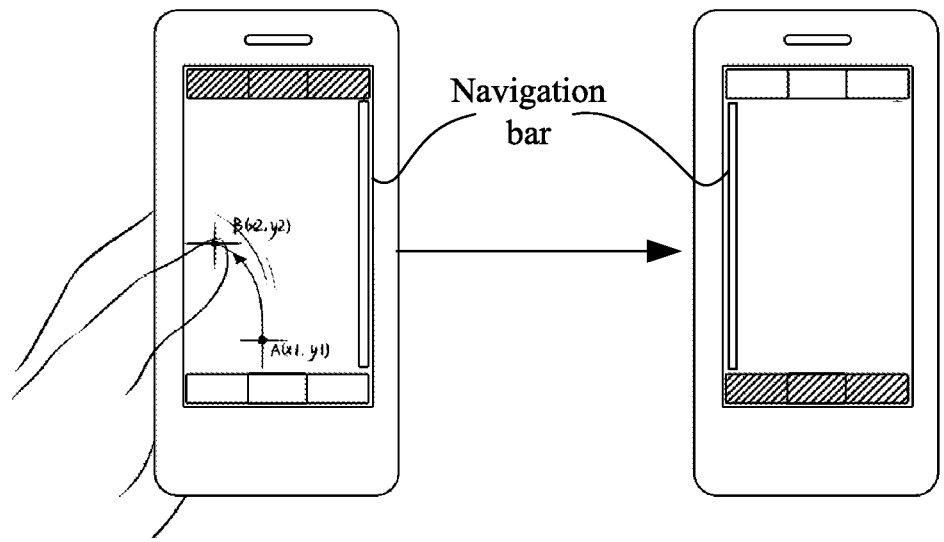
FIG. 10A-10B, is a schematic diagram of presentation of a possible implementation manner for arranging a user interface in Embodiment 1 and Embodiment 5 of the present invention.

Exemplarily, FIG. 10 is a schematic diagram of presentation of a possible implementation manner for arranging a user interface. As shown in FIG. 10, FIG. 10*a* shows a first user interface before arrangement, and FIG. 10*b* shows a second user interface after arrangement. Transformation from FIG. 10*a* to FIG. 10*b* is achieved by using a touchscreen apparatus user interface processing method. Specifically, a letter navigation bar (an element on the user interface) at the right side of the user interface in FIG. 10*a* is transformed to a letter navigation bar at the left side of the user interface in FIG. 10*b* by using the touchscreen apparatus user interface processing method, thereby implementing the arrangement of the user interface, namely, implementing the arrangement from the first user interface to the second user interface.

Figures 11A, 11B:
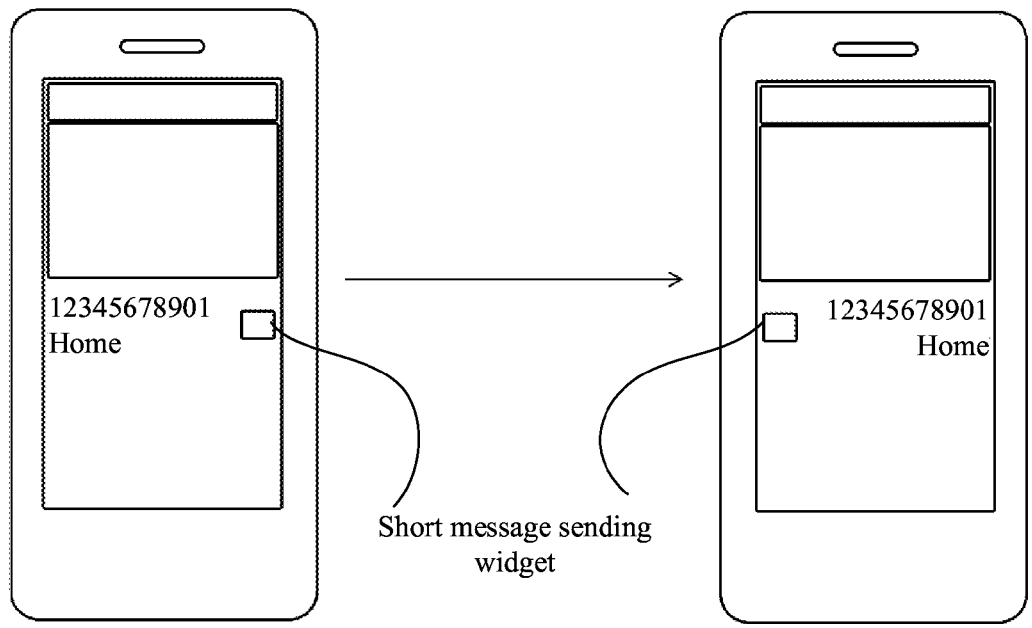
FIG. 11A-11B, is a schematic diagram of presentation of another possible implementation manner for arranging a user interface in Embodiment 1 and Embodiment 5 of the present invention.

Exemplarily, FIG. 11 is a schematic diagram of presentation of another possible implementation manner for arranging a user interface. As shown in FIG. 11, FIG. 11*a* shows a first user interface before arrangement, and FIG. 11*b* shows a second user interface after arrangement. Transformation from FIG. 11*a* to FIG. 11*b* is achieved by using a touchscreen apparatus user interface processing method. Specifically, a short message sending widget (an element on the user interface) at the right side of the user interface in FIG. 11*a* is transformed to a short message sending widget at the left side of the user interface in FIG. 11*b* by using the touchscreen apparatus user interface processing method, thereby implementing the arrangement of the user interface, namely, implementing the arrangement from the first user interface to the second user interface.

Figures 12A, 12B:
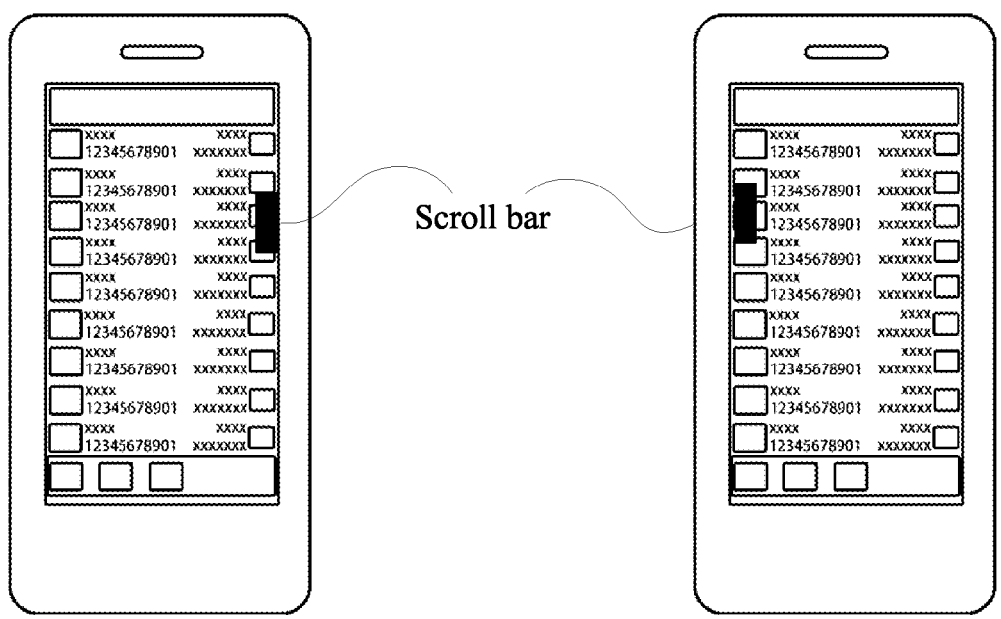
FIG. 12A-12B, is a schematic diagram of presentation of another possible implementation manner for arranging a user interface in Embodiment 1 and Embodiment 5 of the present invention.

Exemplarily, FIG. 12 is a schematic diagram of presentation of another possible implementation manner for arranging a user interface. As shown in FIG. 12, FIG. 12*a* shows a first user interface before arrangement, and FIG. 12b shows a second user interface after arrangement. Transformation from FIG. 12a to FIG. 12b is achieved by using a touchscreen apparatus user interface processing method. Specifically, a navigation bar (an element on the user interface) at the right side of the user interface in FIG. 12a is transformed to a navigation bar at the left side of the user interface in FIG. 12b by using the touchscreen apparatus user interface processing method, thereby implementing the arrangement of the user interface, namely, implementing the arrangement from the first user interface to the second user interface.

Figure 13A:
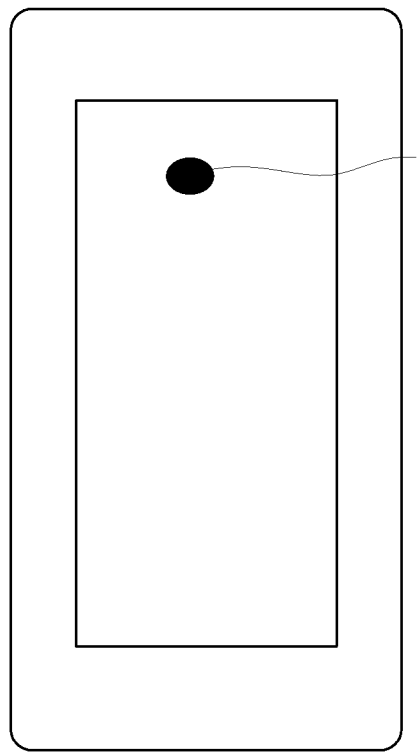
FIG. 13A-13B, is a schematic diagram of presentation of another possible implementation manner for arranging a user interface in Embodiment 1 and Embodiment 5 of the present invention.
Figure 13B:
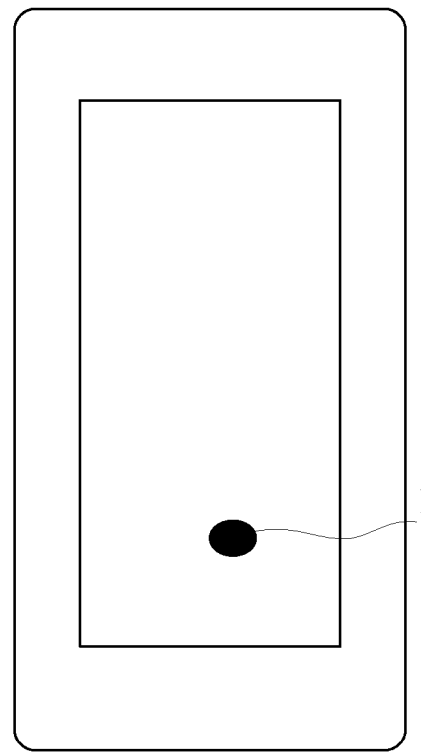

Exemplarily, FIG. 13 is a schematic diagram of presentation of another possible implementation manner for arranging a user interface. As shown in FIG. 13, FIG. 13a shows a first user interface before arrangement, and FIG. 13b shows a second user interface after arrangement. Transformation from FIG. 13a to FIG. 13b is achieved by using a touchscreen apparatus user interface processing method. Specifically, a menu key (an element on the user interface) at an upper portion of the user interface in FIG. 13a is transformed to a menu key at a lower portion of the user interface in FIG. 13b by using the touchscreen apparatus user interface processing method, thereby implementing the arrangement of the user interface, namely, implementing the arrangement from the first user interface to the second user interface.

Figure 14A:
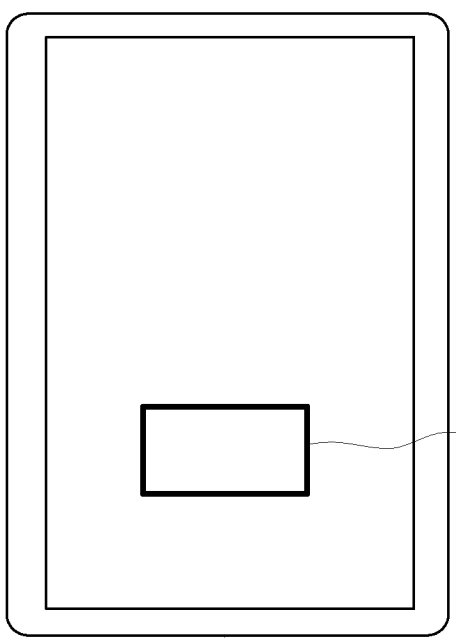
FIG. 14A-14B, is a schematic diagram of presentation of another possible implementation manner for arranging a user interface in Embodiment 1 and Embodiment 5 of the present invention.
Figure 14B:
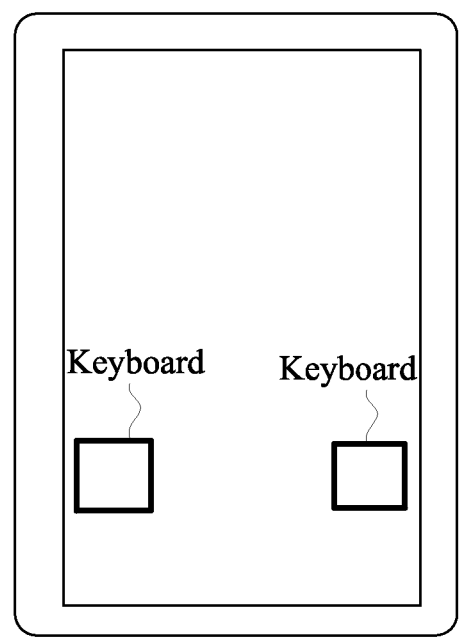

Exemplarily, FIG. 14 is a schematic diagram of presentation of another possible implementation manner for arranging a user interface. As shown in FIG. 14, FIG. 14a shows a first user interface before arrangement, and FIG. 14b shows a second user interface after arrangement. Transformation from FIG. 14a to FIG. 14b is achieved by using a touchscreen apparatus user interface processing method. Specifically, a keyboard (an element on the user interface) at a middle portion of the user interface in FIG. 14a is transformed to keyboards at two sides of the user interface in FIG. 14b by using the touchscreen apparatus user interface processing method, thereby implementing the arrangement of the user interface, namely, implementing the arrangement from the first user interface to the second user interface.

Exemplarily, FIG. 15 is a schematic diagram of presentation of another possible implementation manner for arranging a user interface. As shown in FIG. 15, FIG. 15a shows a first user interface before arrangement, and FIG. 15b shows a second user interface after arrangement. Transformation from FIG. 15a to FIG. 15b is achieved by using a touchscreen apparatus user interface processing method. Specifically, text (an element on the user interface) on the user interface in FIG. 15a is moved to the upper right side of the user interface as shown in FIG. 15b by using the touchscreen apparatus user interface processing method, thereby implementing the arrangement of the user interface, namely, implementing the arrangement from the first user interface to the second user interface.

It should be understood that, the second user interfaces presented in FIG. 2, FIG. 10, FIG. 11, FIG. 12, FIG. 13, FIG. 14, and FIG. 15 are merely possible manners for arranging the first user interface, and other possible arrangement manners are not limited in the embodiment of the present invention. Other presenting manners for arranging the first user interface also belong to the protection scope of the embodiment of the present invention. In the embodiment of the present invention, by using the touchscreen apparatus user interface processing method, intelligent levels of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, step S102 specifically includes: The touch information includes touch position information, and connection line position information between position information of a touch start point and position information of a touch end point is obtained according to the touch position information; a relative position between the touch track information and the connection line position information is determined, where the relative position includes that: the touch track information is located at the right side or the left side of the connection line position information; and the first user interface of the application program is arranged according to the relative position.

A touchscreen apparatus obtains touch information of a user on a touchscreen, where the touch information may include: touch position information. The touch position information may be understood as a set of touch point coordinates. Position information of a start point of a touch position and position information of an end point of the touch position may be obtained according to the touch position information. The start point and the end point are connected by a straight line, and then connection line position information is obtained. In this case, two tracks are formed in total. A first track is a track formed by touch position information that is left by the user on the touchscreen; and a second track is a track formed by the connection line position information. A relative position relationship between the two tracks is determined, that is, the relative position between the touch track information and the connection line position information is determined, where the relative position includes that: the touch track information is located at the right side or the left side of the connection line position information. The first user interface of the application program is arranged according to determination about whether the touch track information is located at the right side of the connection line position information or the touch track information is located at the left side of the connection line position information. If the touch track information is located at the right side of the connection line position information, the user gets used to a left-hand operation, and the first user interface of the application program is arranged according to determination that the touch track information is located at the right side of the connection line position information, that is, an interface design element may be disposed at the left side, or content to be viewed, such as text, is disposed at an upper right portion of the user interface, and vice versa.

A method for determining the relative position between the touch track information and the connection line position information, where the relative position includes that: the touch track information is located at the right side or the left side of the connection line position information, specifically includes: randomly taking N points in the touch position information; taking M points in the connection line position information correspondingly; if the predetermined number of points among the N points (the predetermined number of points is at least greater than N/2, and the specific number is not limited in the embodiment of the present invention) are at one side of the M points, obtaining the relative position between the touch position information and the connection line position information, where M is equal to N, and N and M are natural numbers that are greater than 1. An optional method for determining the relative position between the touch track information and the connection line position information may be specifically described as follows.

In a user interface of an application program with a two-dimensional display interface, a touchscreen of a touchscreen apparatus may be set as grids that have an X direction and a Y direction. Icon information of all application programs on the touchscreen (for example, icon sizes, and icon positions), and touch position information that a user touches a screen may be indicated by numerical values in the two directions: X and Y. When the user touches the screen with a finger, the touchscreen apparatus can obtain a touch point of the user, and the touch position may be indicated by $(X_n, Y_n)$.

FIG. 3 is a schematic diagram of a possible implementation manner for determining the relative position between the touch track information and the connection line position information in Embodiment 1 of the present invention. As shown in FIG. 3, the method for determining the relative position between the touch track information and the connection line position information is specifically as follows.

In the embodiment of the present invention, an origin of coordinates, namely, a coordinate axis is shown in FIG. 3. A track formed by the touch position information is the first track, which may be understood as a set of touch points, namely, [X, Y]. A track formed by the connection line position information is the second track, which may be understood as a set of points, namely, [x, y]. N points are randomly taken from the first track, and coordinates of the N points may be $(X_1, Y_1), (X_2, Y_2), (X_3, Y_3) \ldots (X_N, Y_N)$ respectively. M points are taken from the second track correspondingly, and coordinates of the M points may be $(x_1, y_1), (x_2, y_2), (x_3, y_3) \ldots (x_M, y_M)$ respectively, where M=N, and $Y_n=y_m$, and M and N are natural numbers that are greater than 1.

As shown in FIG. 3b, if coordinates of a predetermined number of points among the N points on the first track satisfy: $X_n > x_m$, a predetermined number of points among the N points on the first track are at the right side of the M points on the second track, that is, the first track is at the right side of the second track. The first user interface of the application program is arranged according to that the first track is at the right side of the second track. Based on that the first track is at the right side of the second track, it may be determined that the user performs an operation with the left hand, and the arranging the first user interface of the application program is performing corresponding arrangement according to a use habit of the user.

As shown in FIG. 3a, if a predetermined number of points among the N points on the first track satisfy: $X_n < x_m$, a predetermined number of points among the N points on the first track are at the left side of the M points on the second track, that is, the first track is at the left side of the second track. The first user interface of the application program is arranged according to that the first track is at the left side of the second track. Based on that the first track is at the left side of the second track, it may be determined that the user performs an operation with the right hand, and the arranging the first user interface of the application program is performing corresponding arrangement according to a use habit of the user.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, step S102 specifically includes: The touch information includes touch position information, and a relative position between the touch track information and a touchscreen is determined according to the touch track information; and the first user interface of the application program is arranged according to the determined relative position.

A touchscreen apparatus obtains touch information of a user on a touchscreen, where the touch information may include: touch track information. A relative position between the touch track information and the entire first user interface is determined according to the touch track information, so as to arrange the first user interface of the application program.

An optional method for determining the relative position between the touch track information and the touchscreen according to the touch track information includes: dividing the touchscreen into four quadrants; and determining the relative position between the touch track information and the touchscreen according to a quadrant where the touch track information is located.

The touchscreen may be divided into four quadrants; the relative position between the touch track information and the touchscreen is determined according to the quadrant where the touch track is located; and the first user interface of the application program is arranged according to the determined relative position. On the basis that the touch track is frequently obtained in a certain quadrant, a use habit of a user may be determined, for example, the user gets used to touching a left portion, a right portion, an upper portion, or a lower portion of the touchscreen. Therefore, the user interface is arranged according to the quadrant where the touch track is located, which may be adaptive to the use habit of the user.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, step S102 specifically includes: The touch information includes touch pressure information and touch position information; and if the touch pressure information is greater than a predetermined pressure value, the first user interface of the application program is arranged according to the touch position information.

A touchscreen apparatus obtains touch information of a user, where the touch information may include: touch position information and touch pressure information. When the touch pressure information is greater than a predetermined pressure value, it may be considered that the user intends to press the touchscreen to arrange the first user interface. In this case, a relative position between a touch position and the entire first user interface may be determined according to the touch position information, and the first user interface of the application program is arranged, so as to be adaptive to a use habit of the user. For example, if the user gets used to touching a left portion, a right portion, an upper portion, or a lower portion of the touchscreen, the user interface is arranged according to a determination result.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, step S102 specifically includes: The touch information includes touch position information; and if the touchscreen apparatus obtains the same touch position information for more than predetermined time or for more than a predetermined number of times, the first user interface of the application program is arranged according to the touch position information.

A touchscreen apparatus obtains touch information of a user, where the touch information may include: touch position information. When the same touch position information is obtained for more than predetermined time, it may be considered that the user expects to arrange the first user interface by long pressing the touchscreen. In this case, a relative position between a touch position and the entire user interface may be determined according to the touch position information, and the first user interface of the application program is arranged, so as to be adaptive to a use habit of the user. For example, if the user gets used to touching a left portion, a right portion, an upper portion, or a lower portion of the touchscreen, the user interface is arranged according to a determination result.

In the same way, when the same touch position is obtained for more than a predetermined number of times, it may be considered that the user quickly clicks the same position of the touchscreen for multiple times so as to arrange the first user interface. At the same time, a relative position between a touch position and the entire first user interface is determined according to the touch position information, and the first user interface of the application program is arranged, so as to be adaptive to a use habit of the user. For example, if the user gets used to touching a left portion, a right portion, an upper portion, or a lower portion of the touchscreen, the user interface is arranged according to a determination result.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, the "S102: Arrange the first user interface of the application program according to the touch information" specifically includes: obtaining an arrangement instruction according to the touch information; within predetermined time, determining the arrangement instruction that is obtained for the greatest number of times; and arranging the first user interface of the application program according to the arrangement instruction that is obtained for the greatest number of times.

Within the predetermined time, obtaining an arrangement instruction that is obtained for the greatest number of times according to the touch information specifically includes: within the predetermined time, counting the number of times for which each type of arrangement instruction is obtained, and obtaining an arrangement instruction that is obtained for the greatest number of times, that is, finally using the arrangement instruction that is obtained for the greatest number of times as an arrangement instruction for arranging the first user interface. The predetermined time may be a few seconds, a few minutes, or a few hours, and may be preset by the touchscreen apparatus, and may also be defined by the user, which is not limited in the embodiment of the present invention. Each type of the arrangement instruction may be consecutively obtained within the predetermined time; alternatively, a first type of arrangement instruction may be obtained, a second or third type of arrangement instruction may be obtained subsequently, and then the first type of arrangement instruction is obtained again. A sequence in which arrangement instructions appear does not affect a counting result.

The arrangement instruction includes multiple types of arrangement instructions, for example, left-side arrangement instruction, right-side arrangement instruction, upper-side arrangement instruction, lower-side arrangement instruction, two-side arrangement instruction, and middle arrangement instruction. All these instructions are used for the exemplary description of the arrangement instruction, and are not limited in the embodiment of the present invention. Definitely, the user is allowed to define the arrangement instruction.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. Meanwhile, the user interface is not frequently changed, thereby avoiding getting the user into unnecessary trouble.

Optionally, in "the arrangement instruction specifically includes: within the predetermined time, obtaining, according to the touch information, the arrangement instruction that is obtained for the greatest number of times", the obtaining the arrangement instruction that is obtained for the greatest number of times specifically includes: within the predetermined time, if the number of times is greater than a predetermined value for the number of times, obtaining the arrangement instruction.

If the number of times is greater than the predetermined value, obtaining the arrangement instruction specifically includes the following. If, within the predetermined time, the arrangement instruction that is obtained for the greatest number of times is obtained, and the number of times is greater than the predetermined value, the arrangement instruction is used as an instruction for arranging the first user interface. If within the predetermined time, the arrangement instruction that is obtained for the greatest number of times is obtained, but the number of times is smaller than the predetermined value for the number of times, finally the arrangement instruction is not obtained. The predetermined value for the number of times may be any natural number such as 1, 2, and 3, and may be preset by the touchscreen apparatus, and may also be defined by the user, which is not limited in the embodiment of the present invention. However, in consideration of the objective of the present invention, design of the predetermined value for the number of times should enable a touchscreen apparatus to be adaptive to an operation habit of a user, which enhances convenience for the user to use a touchscreen apparatus with a large screen. And the user interface is not frequently changed, thereby avoiding getting the user into unnecessary trouble. In the same way, the predetermined time may be any time from 1 minute to 10 minutes, and may be preset by the touchscreen apparatus, and may also be defined by the user, which is not limited in the embodiment of the present invention.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. Meanwhile, the user interface is not frequently changed, thereby avoiding getting the user into unnecessary trouble.

Figure 4:
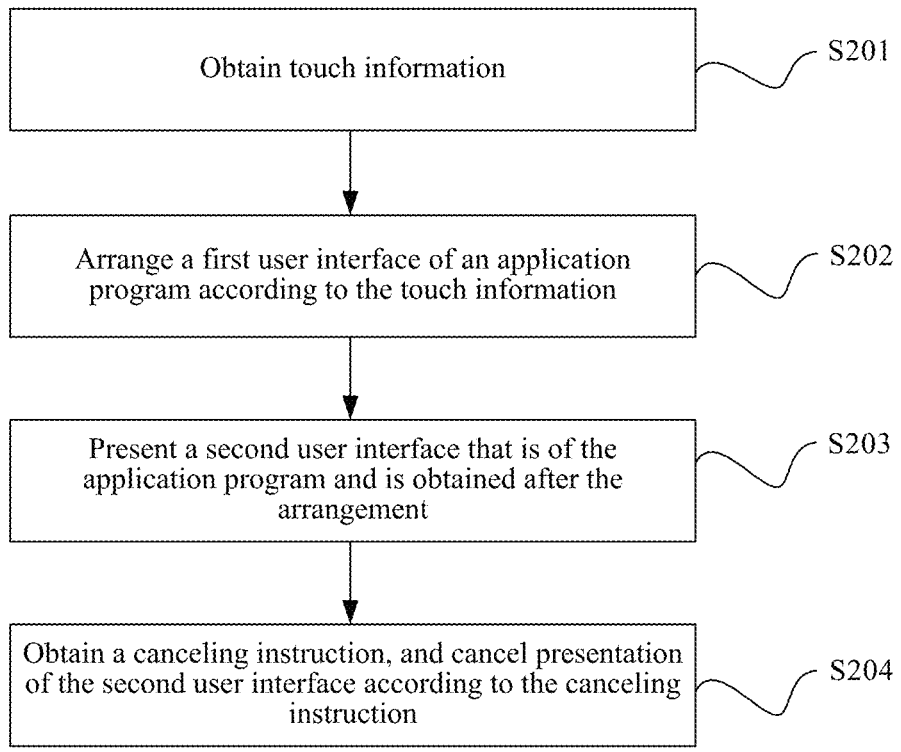
FIG. 4 is a flow chart of a touchscreen apparatus user interface processing method according to Embodiment 2 of the present invention.

FIG. 4 is a flow chart of a touchscreen apparatus user interface processing method according to a second embodiment (Embodiment 2) of the present invention.

As shown in FIG. 4, the touchscreen apparatus user interface processing method may include:

S201: Obtain touch information.

S202: Arrange a first user interface of an application program according to the touch information, where the arrangement is adjusting an element position of the user interface.

S203: Present a second user interface of the application program.

A method in step S201, step S202, and step S203 is the same as the method in step S101, step S102, and step S103 in Embodiment 1. For details, reference is made to the description of the method in step S101, step S102, and step S103, which is not described herein again.

S204: Obtain a canceling instruction, and cancel presentation of the second user interface according to the canceling instruction.

After the touchscreen apparatus arranges the first user interface and presents the second user interface of the application program, if a canceling instruction is obtained, the arrangement of the first user interface is canceled, and the first user interface before the arrangement is presented. After the touchscreen apparatus automatically arranges the first user interface, if a user considers that such arrangement is unnecessary, the user may cancel the arrangement through the canceling instruction.

In the embodiment of the present invention, by using the touchscreen apparatus user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. Meanwhile, a user control function is added, thereby further improving an intelligent level of the touchscreen apparatus.

Figure 5:
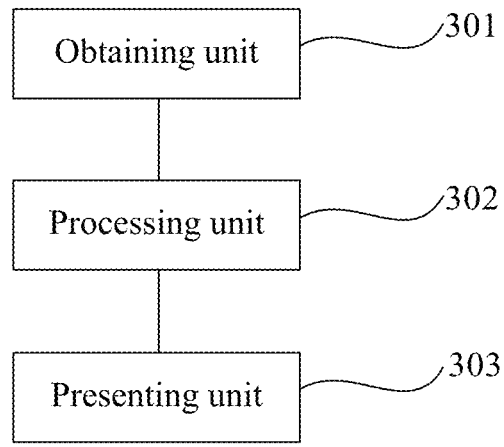
FIG. 5 is a schematic structural diagram of a touchscreen apparatus according to Embodiment 3 of the present invention.

FIG. 5 is a schematic structural diagram of a touchscreen apparatus according to another embodiment (Embodiment 3) of the present invention. As shown in FIG. 5, the touchscreen apparatus in the embodiment of the present invention includes an obtaining unit 301 that is configured to obtain touch information. A processing unit 302 configured to receive the touch information from the obtaining unit and to arrange a first user interface of an application program according to the touch information. The arranging adjusts an element position of the user interface. A presenting unit 303 is configured to receive information of the processing unit 302 and to present a second user interface that is of the application program and is obtained after the arrangement.

The obtaining unit 301 obtains the touch information. The processing unit 302 is configured to receive the touch information from the obtaining unit 301, and arrange the first user interface of the application program according to the touch information. The presenting unit 303 is configured to receive the information of the processing unit 302, and present the second user interface of the application program.

The obtaining unit 301, the processing unit 302, and the presenting unit 303 may be configured to perform the method in step S101, step S102, and step S103 in Embodiment 1. For details, reference is made to the description of the method in step S101, step S102, and step S103, which is not described herein again.

Herein, it should be noted that, apart from the foregoing units, the touchscreen apparatus in the embodiment further has other units for implementing functions of the touchscreen apparatus, which are not limited in the embodiment; and these units are not shown in the accompanying drawings.

In the embodiment of the present invention, a touchscreen apparatus performs a user interface processing method, so that an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, the processing unit 302 is specifically configured to receive the touch information from the obtaining unit, where the touch information comprises touch position information; obtain connection line position information between position information of a touch start point and position information of a touch end point according to the touch position information; determine a relative position between touch track information and the connection line position information, where the relative position includes that: the touch track information is located at the right side or the left side of the connection line position information; and arrange the first user interface of the application program according to the relative position.

The processing unit 302 may be configured to perform the method in step S102 in Embodiment 1. For details, reference is made to the description of the method in Embodiment 1, which is not described herein again.

In the embodiment of the present invention, the touchscreen apparatus performs a user interface processing method, so that an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, the processing unit 302 is specifically configured to receive the touch information from the obtaining unit, where the touch information includes touch track information; determine a relative position between the touch track information and a touchscreen according to the touch track information; and arrange the first user interface of the application program according to the determined relative position.

The processing unit 302 may be configured to perform the method in step S102 in Embodiment 1. For details, reference is made to the description of the method in Embodiment 1, which is not described herein again.

In the embodiment of the present invention, the touchscreen apparatus performs a user interface processing method, so that an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, the processing unit 302 is specifically configured to obtain touch pressure information and touch position information; and if the touch pressure information is greater than a predetermined pressure value, arrange the first user interface of the application program according to the touch position information.

The processing unit 302 may be configured to perform the method in step S102 in Embodiment 1. For details, reference is made to the description of the method in Embodiment 1, which is not described herein again.

In the embodiment of the present invention, the touchscreen apparatus performs a user interface processing method, so that an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, the processing unit 302 is specifically configured to receive the touch information from the obtaining unit, where the touch information comprises touch position information; and if the touchscreen apparatus obtains the same touch position information for more than predetermined time or for more than a predetermined number of times, arrange the first user interface of the application program.

The processing unit 302 may be configured to perform the method in step S102 in Embodiment 1. For details, reference is made to the description of the method in Embodiment 1, which is not described herein again.

In the embodiment of the present invention, the touchscreen apparatus performs a user interface processing method, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, the obtaining unit 301 is further configured to obtain a canceling instruction.

The processing unit 302 is further configured to receive the canceling instruction of the obtaining unit, and cancel presentation of the second user interface according to the canceling instruction.

The obtaining unit 301 and the processing unit 302 may be configured to perform the method in step S102 in Embodiment 1. For details, reference is made to the description of the method in step S102, which is not described herein again.

In the embodiment of the present invention, the touchscreen apparatus performs a user interface processing method, so that an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. Meanwhile, a user control function is added, thereby further improving an intelligent level of the touchscreen apparatus.

Figure 6:
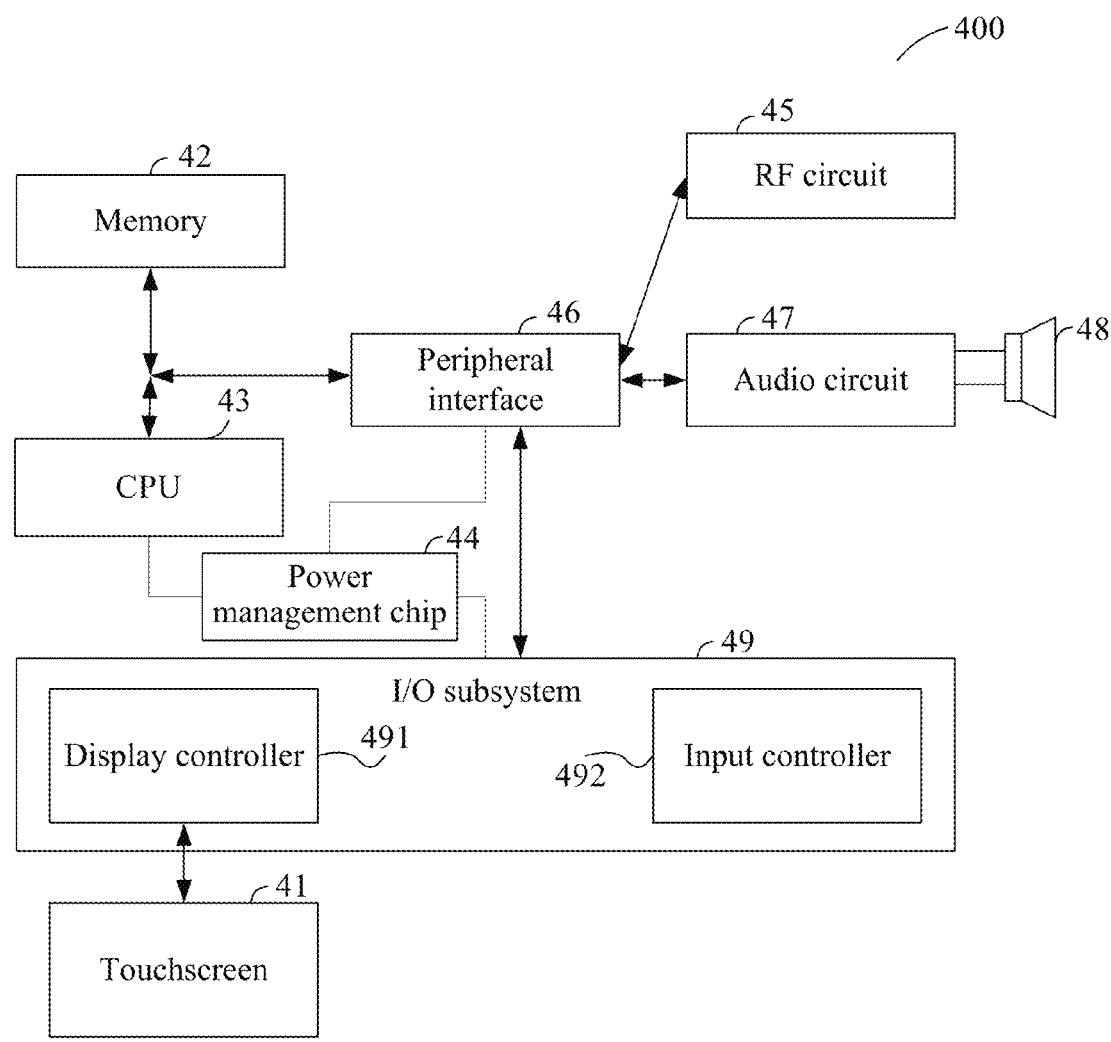
FIG. 6 is a schematic structural diagram of a mobile phone according to Embodiment 4 of the present invention.

A fourth embodiment (Embodiment 4) will now be described. A user interface processing touchscreen apparatus includes: a touchscreen, a memory, a CPU, a power management chip, an RF circuit, a peripheral interface, an audio circuit, a loudspeaker, and an I/O subsystem. The touchscreen is configured to obtain touch information and control information; the CPU is configured to arrange a first user interface of an application program according to the touch information, where the arrangement is adjusting an element position of the user interface; the touchscreen is further configured to receive a processing result of the CPU, and present a second user interface that is of the application program and is obtained after the arrangement. In the embodiment, a mobile phone is taken as an example for detailed description in the embodiment of the present invention. FIG. 6 is a schematic structural diagram of a touchscreen apparatus according to Embodiment 4 of the present invention. As shown in FIG. 6, the mobile phone includes: a touchscreen 41, a memory 42, a CPU 43, a power management chip 44, an RF circuit 45, a peripheral interface 46, an audio circuit 47, a loudspeaker 48, and an I/O subsystem 49. It should be understood that, the mobile phone shown in FIG. 6 is merely an example of the touchscreen apparatus, and the mobile phone may have more or less components than components shown in the figure, may combine two or more components, or may have different component configurations. Various kinds of components shown in the figure may be implemented through hardware, software, or a combination of hardware and software, where the hardware, the software, or the combination of the hardware and the software includes one or more signal processing and/or dedicated integrated circuits.

The touchscreen 41 is configured to obtain touch information and a control instruction. The touch information includes: touch position information, touch pressure information, and so on. For a method for the touchscreen to obtain the touch information, reference is made to the method in S101 in Embodiment 1, which is not described herein again. The control instruction includes a canceling instruction, a stop instruction, and an enabling instruction. The control instruction may be used for performing the method in Embodiment 1. For details, reference is made to the method in Embodiment 1, which is not described herein again.

The touchscreen 41 may further be configured to present a first user interface of an application program, a second user interface of the application program, and a third user interface of the application program. The first user interface is an interface before the arrangement; the second user interface is a user interface after the first user interface is arranged; and the third user interface is a user interface that is presented after presentation of the second user interface is canceled according to the canceling instruction.

The touchscreen 41 is an input and output interface between the mobile phone and a user, which may further present a visible output to the user apart from having a function for obtaining touch information and a control instruction of the user, where the visible output may include a graph, text, an icon, video, and so on.

The memory 42 may be configured to store the touch information. The touch information includes: touch position information, touch pressure information, and so on. The memory 42 may be accessed by the CPU 43, the peripheral interface 46, and so on. The memory 42 may include a high-speed random access memory, and may also include a nonvolatile memory, for example, one or more magnetic disk storage devices, flash memory devices, or other volatile solid storage devices.

The CPU 43 may be configured to obtain the touch information from the obtaining unit, and arrange the first user interface of the application program according to the touch information; and may further process the control instruction, so as to control a user interface that is presented on the touchscreen 41. The CPU 43 may perform one or a combination of the foregoing functions, so as to implement arrangement of the first user interface, which is not limited in the embodiment of the present invention. The CPU 43 is a control center of a mobile phone 400, which connects various parts of the whole mobile phone through various kinds of interfaces and circuits, and performs various kinds of functions of the mobile phone 400 and processes data by running or performing a software program and/or a module stored in the memory 42 and invoking data stored in the memory 42, thereby monitoring the mobile phone on the whole. Optionally, the CPU 43 may include one or more processing units. Optimally, the CPU 43 may be integrated with an application processor and a modem processor. Optionally, the application processor mainly processes an operating system, a user interface, an application program, and so on. The modem processor mainly processes wireless communication. It may be understood that, the foregoing modem processor may not be integrated in the CPU 43. It should further be understood that, the foregoing function is merely one of functions that can be performed by the CPU 43, and other functions are not limited in the embodiment of the present invention.

The power management chip 44 may be configured to supply power to the CPU 43, the I/O subsystem 49, and hardware that is connected by the peripheral interface 46, and perform power management.

The RF circuit 45 is mainly configured to establish communication between the mobile phone and a wireless network (namely, a network side), so as to implement data obtaining and sending between the mobile phone and the wireless network, for example, sending and receiving a short message, an email, and so on. Specifically, the RF circuit 45 obtains and sends an RF signal, where the RF signal is also referred to as an electromagnetic signal. The RF circuit 45 converts an electrical signal into an electromagnetic signal or converts an electromagnetic signal into an electrical signal, and communicates with a communication network or another device through the electromagnetic signal. The RF circuit 45 may include known circuits used for performing these functions, where the known circuits include but are not limited to an antenna system, an RF transceiver, one or more amplifiers, a tuner, one or more oscillators, a digital signal processor, a CODEC chip set, a subscriber identity module (Subscriber Identity Module, SIM), and so on.

The peripheral interface 46 may connect input and output peripheries of a device to the CPU 43 and the memory 42.

The audio circuit 47 may be mainly configured to obtain audio data from the peripheral interface 46, convert the audio data into an electrical signal, and send the electrical signal to the loudspeaker 48.

The loudspeaker 48 may be configured to restore a voice signal that is obtained by the mobile phone from the wireless network through the RF circuit 45 to voice, and plays the voice to the user.

The I/O subsystem 49 may control the input and output peripheries on the device. The I/O subsystem 49 may include a display controller 491 and one or more input controllers 492 for controlling other input/control devices. Optionally, the one or more input controllers 492 obtain an electrical signal from other input/control devices or send an electrical signal to other input/control devices. Other input/control devices may include: a physical button (a press button or a rocker arm button), a dial plate, a slide switch, an operating lever, and a clicking scroll. It should be noted that, the input controller 492 may be connected to any one of the following: a keyboard, an infrared port, a USB interface, and an instruction device such as a mouse. The display controller 491 in the I/O subsystem 49 obtains an electrical signal from the touchscreen 41 or sends an electrical signal to the touchscreen 41. The touchscreen 41 obtains touch on the touchscreen. The display controller 491 converts the obtained touch into an interaction with a user interface object that is presented on the touchscreen 41, thereby implementing man-machine interaction. The user interface object that is presented on the touchscreen 41 may be an icon for running a game, an icon for access to a corresponding network, a filtering mode, and so on. It should be noted that, the device may further include an optical mouse. The optical mouse is a touch-sensitive surface that does not present a visible output, or an extension of a touch-sensitive surface that is formed by the touchscreen.

In Embodiment 4 of the present invention, the touchscreen 41 may present graphical user interfaces shown in FIG. 2, FIG. 7, and FIG. 8, and obtain touch information and a control instruction that are generated when a user touches the touchscreen. The memory 42 obtains the touch information and the control instruction through the touchscreen 41 and stores the touch information and the control instruction. The CPU 43 arranges the first user interface of the application program according to the touch information. The touchscreen 41 arranges the presented first user interface according to an arrangement instruction of the CPU 43, and presents the second user interface of the application program.

The foregoing structure may be used for performing the methods in Embodiment 1 and Embodiment 2. For details, reference is made to the methods described in Embodiment 1 and Embodiment 2, which are not described herein again.

In the embodiment of the present invention, by using the mobile phone user interface processing method, an intelligent level of arrangement of a mobile phone user interface and interactivity with a user are improved. The mobile phone user interface is adaptive to an operation habit of the user, which enhances convenience for the user to use a mobile phone with a large screen. Meanwhile, a user control function is added, thereby further improving an intelligent level of the mobile phone.

A fifth embodiment (Embodiment 5) will now be discussed. Based on the touchscreen apparatus provided in the third embodiment of the present invention, the embodiment of the present invention further provides a graphical user interface that is set on the touchscreen apparatus described in Embodiment 3. The graphical user interface specifically includes displaying a first user interface of an application program and displaying a second user interface of the application program. The second user interface is a graphical user interface after the first user interface of the application program is arranged according to touch information. The arrangement adjusts an element position of the user interface.

The first user interface is a graphical user interface before the touchscreen apparatus described in Embodiment 3 performs presentation of the second user interface of the application program in Embodiment 1, that is, the first user interface is an original graphical user interface. It should be understood that, the first user interface is a graphical user interface that is presented to a user when the application program has already been started, during a starting process of the application program, and during a closing process of the application program.

The second user interface is a graphical user interface after the touchscreen apparatus described in Embodiment 3 performs the method for arranging the first user interface in Embodiment 1. For a detail method, reference is made to the description of the method described in Embodiment 1, which is not described herein again. It should be understood that, the second user interface is a graphical user interface that is presented to the user when the application program has already been started, during a starting process of the application program, and during a closing process of the application program.

Exemplarily, FIG. 2 is a schematic diagram of arrangement of a user interface. As shown in FIG. 2, there are elements A, B, C, and D on a user interface 1. The arrangement may be arranging a position of one element A of the user interface, as shown in FIG. 2a; may also be arranging positions of two elements, namely elements A and B on the user interface, as shown in FIG. 2b; and may also be arranging positions of all elements, namely, elements A, B, C, and D on the user interface, as shown in FIG. 2c.

Exemplarily, FIG. 10 is a schematic diagram of presentation of a possible implementation manner for arranging a user interface. As shown in FIG. 10, FIG. 10a shows a first user interface before arrangement, and FIG. 10b shows a second user interface after arrangement. Transformation from FIG. 10a to FIG. 10b is achieved by using a touchscreen apparatus user interface processing method. Specifically, a letter navigation bar (an element on the user interface) at the right side of the user interface in FIG. 10a is transformed to a letter navigation bar at the left side of the user interface in FIG. 10b by using the touchscreen apparatus user interface processing method, thereby implementing the arrangement of the user interface, namely, implementing the arrangement from the first user interface to the second user interface.

Exemplarily, FIG. 11 is a schematic diagram of presentation of another possible implementation manner for arranging a user interface. As shown in FIG. 11, FIG. 11a shows a first user interface before arrangement, and FIG. 11b shows a second user interface after arrangement. Transformation from FIG. 11a to FIG. 11b is achieved by using a touchscreen apparatus user interface processing method. Specifically, a short message sending widget (an element on the user interface) at the right side of the user interface in FIG. 11a is transformed to a short message sending widget at the left side of the user interface in FIG. 11b by using the touchscreen apparatus user interface processing method, thereby implementing the arrangement of the user interface, namely, implementing the arrangement from the first user interface to the second user interface.

Exemplarily, FIG. 12 is a schematic diagram of presentation of another possible implementation manner for arranging a user interface. As shown in FIG. 12, FIG. 12a shows a first user interface before arrangement, and FIG. 12b shows a second user interface after arrangement. Transformation from FIG. 12a to FIG. 12b is achieved by using a touchscreen apparatus user interface processing method. Specifically, a navigation bar (an element on the user interface) at the right side of the user interface in FIG. 12a is transformed to a navigation bar at the left side of the user interface in FIG. 12b by using the touchscreen apparatus user interface processing method, thereby implementing the arrangement of the user interface, namely, implementing the arrangement from the first user interface to the second user interface.

Exemplarily, FIG. 13 is a schematic diagram of presentation of another possible implementation manner for arranging a user interface. As shown in FIG. 13, FIG. 13a shows a first user interface before arrangement, and FIG. 13b shows a second user interface after arrangement. Transformation from FIG. 13a to FIG. 13b is achieved by using a touchscreen apparatus user interface processing method. Specifically, a menu key (an element on the user interface) at an upper portion of the user interface in FIG. 13a is transformed to a menu key at a lower portion of the user interface in FIG. 13b by using the touchscreen apparatus user interface processing method, thereby implementing the arrangement of the user interface, namely, implementing the arrangement from the first user interface to the second user interface.

Exemplarily, FIG. 14 is a schematic diagram of presentation of another possible implementation manner for arranging a user interface. As shown in FIG. 14, FIG. 14a shows a first user interface before arrangement, and FIG. 14b shows a second user interface after arrangement. Transformation from FIG. 14a to FIG. 14b is achieved by using a touchscreen apparatus user interface processing method. Specifically, a keyboard (an element on the user interface) at a middle portion of the user interface in FIG. 14a is transformed to keyboards at two sides of the user interface in FIG. 14b by using the touchscreen apparatus user interface processing method, thereby implementing the arrangement of the user interface, namely, implementing the arrangement from the first user interface to the second user interface.

Exemplarily, FIG. 15 is a schematic diagram of presentation of another possible implementation manner for arranging a user interface. As shown in FIG. 15, FIG. 15a shows a first user interface before arrangement, and FIG. 15b shows a second user interface after arrangement. Transformation from FIG. 15a to FIG. 15b is achieved by using a touchscreen apparatus user interface processing method. Specifically, text (an element on the user interface) on the user interface in FIG. 15a is moved to the upper right side of the user interface as shown in FIG. 15b by using the touchscreen apparatus user interface processing method, thereby implementing the arrangement of the user interface, namely, implementing the arrangement from the first user interface to the second user interface.

It should be understood that, the second user interfaces presented in FIG. 2, FIG. 10, FIG. 11, FIG. 12, FIG. 13, FIG. 14, and FIG. 15 are merely possible manners for arranging the first user interface, and other possible arrangement manners are not limited in the embodiment of the present invention. Other presenting manners for arranging the first user interface also belong to the protection scope of the embodiment of the present invention.

Through a graphical user interface provided by a touchscreen apparatus, an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen.

Optionally, after the presenting the second user interface of the application program, the graphical user interface further includes: displaying a third user interface of the application program, where the third user interface is a graphical user interface that is displayed after presentation of the second user interface is canceled according to a canceling instruction.

According to the method in step S205 in Embodiment 2, the third user interface is the same as the first user interface before the arrangement.

A touchscreen apparatus provides a graphical user interface, so that an intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. Meanwhile, a user control function is added, thereby further improving an intelligent level of the touchscreen apparatus.

A sixth embodiment (Embodiment 6) of the present invention provides a computer readable medium that stores one or more programs. The one or more programs include an instruction, and when the instruction is run by a touchscreen apparatus, the instruction enables the touchscreen apparatus to perform the following operations. Touch information is obtained. The specific implementation manner is the same as that in step 101 shown in FIG. 1, which is not described herein again. A first user interface of an application program is arranged according to the touch information. The arranging is adjusting an element position of the user interface. The specific implementation manner is the same as that in step 102 shown in FIG. 1, which is not described herein again. A second user interface of the application program is presented. The specific implementation manner is the same as that in step 103 shown in FIG. 1, which is not described herein again.

By using a storage medium, a touchscreen apparatus user interface processing method is stored. An intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. An intelligent level of the touchscreen apparatus is further improved.

A readable medium of a touchscreen apparatus includes a storage medium and a communication medium of the touchscreen apparatus. Optionally, the communication medium includes any medium that can transfer a program of the touchscreen apparatus from one place to another place; the storage medium may be any available medium that can be accessed by the touchscreen apparatus. For example, the readable medium of the touchscreen apparatus may include but is not limited to a RAM, a ROM, an EEPROM, a CD-ROM or other optical disk storage and magnetic storage medium, or other magnetic storage devices, or any other medium that can carry or store expected program codes that have an instruction or a data structure form and can be accessed by the touchscreen apparatus. In addition, any connection may become a readable medium of the touchscreen apparatus appropriately. For example, if software is transmitted from a website, a service, or other remote sources by using a coaxial cable, an optical fiber cable, a twisted pair cable, a digital subscriber line (DSL), or wireless technologies such as an infrared ray, radio, and a microwave, the coaxial cable, the optical fiber cable, the twisted pair cable, the DSL, or wireless technologies such as an infrared ray, radio, and a microwave are included in a definition of the medium. For example, a disk (Disk) and a disc (disc) used in the embodiment of the present invention include a compact disc (CD), a laser disc, an optical disc, a digital video disc (DVD), a floppy disk, and a blue ray disc. Optionally, the disk usually duplicates data magnetically, and the disc usually duplicates data optically by using a laser.

By using a storage medium, a touchscreen apparatus user interface processing method is stored. An intelligent level of arrangement of a touchscreen apparatus user interface and interactivity with a user are improved. The touchscreen apparatus user interface is adaptive to an operation habit of the user, which enhances convenience for the user to use a touchscreen apparatus with a large screen. An intelligent level of the touchscreen apparatus is further improved.

Through the foregoing description of the implementation manners, persons skilled in the art may clearly understand that the embodiments of the present invention may be implemented through hardware, software, or their combination. The foregoing combination shall also fall within the protection scope of the readable medium of the touchscreen apparatus. To sum up, the foregoing descriptions are only the embodiments of the technical solutions of the present invention, but are not intended to limit the protection scope of the present invention. Any modification, equivalent replacement, or improvement made within the spirit and principle of the present invention shall all fall within the protection scope of the present invention.

What is claimed is:

1. A touchscreen apparatus user interface processing method, comprising:
    obtaining touch information, wherein the touch information comprises touch track information;
    obtaining connection line position information between position information of a touch start point and position information of a touch end point according to the touch track information;
    determining a relative position between the touch track information and the connection line position information, wherein the relative position comprises information related to whether the touch track information is located at the right side or the left side of the connection line position information, wherein determining the relative position comprises:
        taking N points in the touch track information;
        taking M points in the connection line position information correspondingly;
        if a predetermined number of points among the N points are located at the left side of the M points, determining that the touch track information is located at the left side of the connection line position information; and
        if a predetermined number of points among the N points are located at the right side of the M points, determining that the touch track information is located at the right side of the connection line position information,
        wherein N and M are natural numbers that are greater than 1;
    arranging a first user interface of an application program according to the relative position to obtain a second user interface of the application program, wherein the arranging comprises adjusting an element position of the first user interface; and
    presenting the second user interface of the application program.

2. The method according to claim 1, the method further comprising:
    obtaining an arrangement instruction according to the touch information;
    within a predetermined time, determining the arrangement instruction that is obtained for the greatest number of times; and
    arranging the first user interface of the application program according to the arrangement instruction that is obtained for the greatest number of times.

3. The method according to claim 2, wherein determining the arrangement instruction that is obtained for the greatest number of times comprises:
    within the predetermined time, if the number of times is greater than a predetermined value for the number of times, obtaining the arrangement instruction that is obtained for the greatest number of times.

4. The method according to claim 1, wherein the touch information comprises touch pressure information and touch position information and wherein the arranging comprises:
if the touch pressure information is greater than a predetermined pressure value, arranging the first user interface of the application program according to the touch position information.

5. The method according to claim 1, wherein the touch information comprises touch position information and the arranging comprises:
if the touchscreen apparatus obtains the same touch position information for more than predetermined time or for more than a predetermined number of times, arranging the first user interface of the application program according to the touch position information.

6. The method according to claim 1, wherein after presenting the second user interface of the application program, the method further comprises:
obtaining a canceling instruction; and
canceling presentation of the second user interface according to the canceling instruction.

7. A user interface processing touchscreen apparatus, comprising:
an touchscreen, configured to obtain touch information; and
a processor, configured to receive the touch information from the touchscreen and to arrange a first user interface of an application program according to the touch information, wherein the arranging comprises adjusting an element position of the first user interface;
wherein the touchscreen is further configured to receive information from the processor and to present a second user interface that is of the application program and obtained after the arranging; and
wherein the processor is further configured to:
receive the touch information from the touchscreen, wherein the touch information comprises touch track information;
obtain connection line position information between position information of a touch start point and position information of a touch end point according to the touch track information;
determine a relative position between the touch track information and the connection line position information, wherein the relative position comprises information related to whether the touch track information is located at the right side or the left side of the connection line position information, wherein processor is configured to determine the relative position by:
taking N points in the touch track information;
taking M points in the connection line position information correspondingly;
if a predetermined number of points among the N points are located at the left side of the M points, determining that the touch track information is located at the left side of the connection line position information; and
if a predetermined number of points among the N points are located at the right side of the M points, determining that the touch track information is located at the right side of the connection line position information,
wherein N and M are natural numbers that are greater than 1; and arrange the first user interface of the application program according to the relative position.

8. The touchscreen apparatus according to claim 7, wherein the processor is further configured to:
receive touch pressure information and touch position information from the touchscreen; and
if the touch pressure information is greater than a predetermined pressure value, arrange the first user interface of the application program according to the touch position information.

9. The touchscreen apparatus according to claim 7, wherein the processor is specifically configured to:
receive the touch information from the touchscreen, where the touch information comprises touch position information; and
if the touchscreen obtains the same touch position information for more than a predetermined time or for more than a predetermined number of times, arrange the first user interface of the application program according to the touch position information.

10. The touchscreen apparatus according to claim 7, wherein
the touchscreen is further configured to obtain a canceling instruction; and
the processor is further configured to receive the canceling instruction of the touchscreen and to cancel presentation of the second user interface according to the canceling instruction.

11. A user interface processing touchscreen apparatus, comprising: a touchscreen, a memory, a CPU, a power management chip, an RF circuit, a peripheral interface, an audio circuit, a loudspeaker, and an I/O subsystem, wherein:
the touchscreen is configured to obtain touch information;
the CPU is configured to receive the touch information of the touchscreen, and arrange a first user interface of an application program according to the touch information, wherein the arrangement is adjusting an element position of the first user interface; and
the touchscreen is further configured to receive an arrangement processing result of the CPU, and present a second user interface that is of the application program and is obtained after the arrangement;
wherein the CPU is further configured to:
receive the touch information of the touchscreen, wherein the touch information comprises touch track information;
obtain connection line position information between position information of a touch start point and position information of a touch end point according to the touch track information;
determine a relative position between the touch track information and the connection line position information, wherein the relative position comprises information related to whether the touch track information is located at the right side or the left side of the connection line position information, wherein the CPU is configured to determine the relative position by:
taking N points in the touch track information;
taking M points in the connection line position information correspondingly;
if a predetermined number of points among the N points are located at the left side of the M points, determining that the touch track information is located at the left side of the connection line position information; and if a predetermined number of points among the N points are located at the right side of the M points, determining that the touch track information is located at the right side of the connection line position information, wherein N and M are natural numbers that are greater than 1; and arrange the first user interface of the application program according to the relative position.

12. A graphical user interface that is set on a touchscreen apparatus, the touchscreen apparatus comprising: a touchscreen, a memory, an application program stored in the memory, a processor used to implement the application program stored in the memory, wherein:

the touchscreen comprises a display screen and is configured to:

obtain touch information; and receive information from the processor and to present a second user interface that is of the application program and is obtained after an arrangement of a first user interface by the processor; and the processor is configured to:

receive the touch information from the touchscreen, the touch information comprising touch track information;

arrange the first user interface of an application program according to the touch information;

receive the touch information from the touchscreen;

obtain connection line position information between position information of a touch start point and position information of a touch end point according to the touch track information;

determine a relative position between the touch track information and the connection line position information, wherein the relative position comprises information related to whether the touch track information is located at the right side or the left side of the connection line position information, wherein the processor is configured to determine the relative position comprises:

taking N points in the touch track information;

taking M points in the connection line position information correspondingly;

if a predetermined number of points among the N points are located at the left side of the M points, determining that the touch track information is located at the left side of the connection line position information; and if a predetermined number of points among the N points are located at the right side of the M points, determining that the touch track information is located at the right side of the connection line position information, wherein N and M are natural numbers that are greater than 1; and arrange the first user interface of the application program according to the relative position; and wherein the graphical user interface is configured to:

display the first user interface of the application program; and display the second user interface of the application program, wherein the second user interface is a graphical user interface after the first user interface of the application program is arranged according to touch information, and the arrangement is adjusting an element position of the first user interface.

13. The graphical user interface according to claim 12, wherein after the displaying the second user interface of the application program, the graphical user interface is configured to:

display a third user interface of the application program, wherein the third user interface is a graphical user interface after presentation of the second user interface is canceled according to a canceling instruction.

* * * * *